(12) United States Patent
Zhao et al.

(10) Patent No.: US 11,470,647 B2
(45) Date of Patent: Oct. 11, 2022

(54) METHOD AND DEVICE FOR TWO-STEP CONTENTION BASED RANDOM ACCESS

(71) Applicant: CHINA ACADEMY OF TELECOMMUNICATIONS TECHNOLOGY, Beijing (CN)

(72) Inventors: Yali Zhao, Beijing (CN); Li Chen, Beijing (CN); Fangli Xu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 209 days.

(21) Appl. No.: 16/475,948

(22) PCT Filed: Feb. 12, 2018

(86) PCT No.: PCT/CN2018/076501
§ 371 (c)(1),
(2) Date: Jul. 3, 2019

(87) PCT Pub. No.: WO2018/127244
PCT Pub. Date: Jul. 12, 2018

(65) Prior Publication Data
US 2019/0350004 A1 Nov. 14, 2019

(30) Foreign Application Priority Data
Jan. 5, 2017 (CN) .......................... 201710007274.7

(51) Int. Cl.
*H04W 74/08* (2009.01)
*H04W 76/11* (2018.01)
(Continued)

(52) U.S. Cl.
CPC ... *H04W 74/0833* (2013.01); *H04W 28/0278* (2013.01); *H04W 56/0045* (2013.01); *H04W 76/11* (2018.02); *H04W 88/023* (2013.01)

(58) Field of Classification Search
CPC ............. H04W 74/0833; H04W 76/11; H04W 56/0045; H04W 88/023
See application file for complete search history.

(56) References Cited

U.S. PATENT DOCUMENTS

2008/0194243 A1* 8/2008 Jeong ................ H04W 74/0841
455/418
2008/0233941 A1* 9/2008 Jen ...................... H04W 74/002
455/418
(Continued)

FOREIGN PATENT DOCUMENTS

| CN | 102104961 A | 6/2011 |
|----|----|----|
| CN | 103298134 A | 9/2013 |
| CN | 103826318 A | 5/2014 |

OTHER PUBLICATIONS

International Search Report for PCT/CN2018/076501 dated Apr. 27, 2018 and its English translation provided by WIPO.
(Continued)

*Primary Examiner* — Christopher M Crutchfield
*Assistant Examiner* — Tito Q Pham
(74) *Attorney, Agent, or Firm* — Ladas & Parry, LLP (57) ABSTRACT

A method and a device for two-step contention based random access are provided. The method includes: sending, by a user equipment (UE), an Msg1 message; and determining that two-step random access of the user equipment is successful, in a case that a UE identifier carried in the Msg1 message is a cell radio network temporary identifier (C-RNTI) and physical layer scheduling signaling addressed based on the C-RNTI is received by the user equipment. For two-step contention based random access, if the UE identifier carried in the Msg1 message is a C-RNTI, the user equipment determines that the two-step random access is successful in a case that the physical layer scheduling signaling addressed based on the C-RNTI is received by the (Continued)

user equipment. In this way, the two-step contention based random access can be achieved.

20 Claims, 4 Drawing Sheets

(51) Int. Cl.
*H04W 88/02* (2009.01)
*H04W 28/02* (2009.01)
*H04W 56/00* (2009.01)

(56) References Cited

U.S. PATENT DOCUMENTS

| | | | | |
|---|---|---|---|---|
| 2014/0161070 A1* | 6/2014 | Chang | ............ | H04W 56/001 |
| | | | | 370/329 |
| 2015/0236932 A1* | 8/2015 | Yu | ............ | H04B 17/309 |
| | | | | 370/252 |
| 2016/0165640 A1* | 6/2016 | Yang | ............ | H04W 72/0446 |
| | | | | 370/336 |
| 2016/0360393 A1* | 12/2016 | Wu | ............ | H04W 72/042 |
| 2017/0019930 A1* | 1/2017 | Lee | ............ | H04W 72/1284 |
| 2018/0103459 A1* | 4/2018 | Liu | ............ | H04L 1/08 |
| 2018/0212736 A1* | 7/2018 | Chatterjee | ............ | H04L 5/0094 |
| 2018/0227851 A1* | 8/2018 | Kubota | ............ | H04W 76/28 |
| 2018/0249508 A1* | 8/2018 | Gao | ............ | H04L 5/0053 |
| 2020/0052838 A1* | 2/2020 | Yuan | ............ | H04L 1/1671 |

OTHER PUBLICATIONS

Written Opinion of the International Search Authority for PCT/CN2018/076501 dated Apr. 27, 2018 and its English translation provided by WIPO.

International Preliminary Report on Patentability of the International Search Authority for PCT/CN2018/076501 dated Jul. 9, 2019 and its English translation provided by WIPO.

First office action and search report for Chinese patent application 201710007274.7 dated Jan. 2, 2019 and its English translation provided by SIPO.

"On 2-step RACH procedure in NR" 3GPP TSG RAN WG1 Meeting #87 R1-1611274 Reno, USA, Nov. 14-18, 2016 ZTE Corporation, ZTE Microelectronics.

"Random Access enhancements" 3GPP TSG-RAN WG2 #96 Tdoc R2-168665 Reno, Nevada, USA, Nov. 14-18, 2016 Ericsson.

* cited by examiner

METHOD AND DEVICE FOR TWO-STEP CONTENTION BASED RANDOM ACCESS

CROSS-REFERENCE TO RELATED APPLICATIONS

This application is the U.S. national phase of PCT Application No. PCT/CN2018/076501 filed on Feb. 12, 2018, which claims a priority to Chinese Patent Application No. 201710007274.7 filed in China on Jan. 5, 2017, the disclosure of which are incorporated incorporated in their entireties by reference herein.

TECHNICAL FIELD

The present disclosure relates to the technical field of communications, and in particular to a method and a device for two-step contention based random access.

BACKGROUND

Random access of a Long Term Evolution (LTE) system is divided into two types: contention based random access and non-contention based random access, with the respective procedures as follows.

Figure 1:
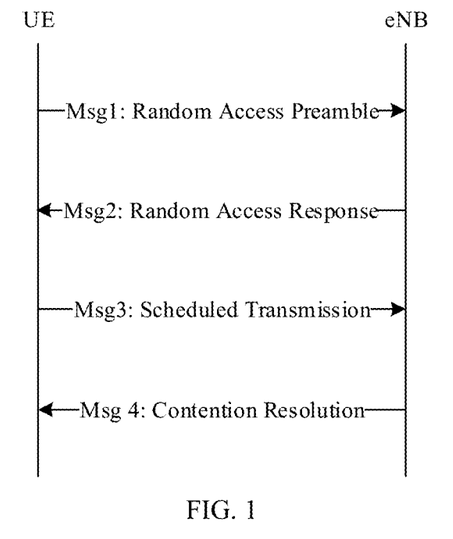
FIG. 1 is a schematic diagram showing a procedure of a four-step contention based random access of an LTE system in the related art.

The contention based random access is used for: initial access of a user equipment; Radio Resource Control (RRC) connection reestablishment; handover; downlink data arrival in a RRC connected state in a non-synchronized status; uplink data arrival in the RRC connected state; and positioning in the RRC connected state. Procedures thereof are shown in FIG. 1, primarily including four steps.

Msg1: a User Equipment (UE) selects a random access preamble and a Physical Random Access Channel (PRACH) resource, and uses the PRACH resource to send the selected random access preamble to a base station.

Msg2: The base station receives the preamble, calculates a time advance (TA), and sends a random access response to the UE. The random access response includes information about the time advance and a UL grant (uplink scheduling grant) for Msg3, and a Cell Radio Network Temporary Identifier (C-RNTI) allocated by a network side device. Physical downlink control channel (PDCCH) carrying an Msg2 scheduling message is scrambled by a Random Access Radio Network Temporary Identifier (RA-RNTI), and the RA-RNTI uniquely corresponds to a time-frequency resource sending the Msg1, in a 10 ms window. In addition, the Msg2 also carries a preamble ID, and the UE determines, according to the RA-RNTI and the preamble ID, that the Msg2 corresponds to the Msg1 sent thereby.

Msg3: The UE sends an uplink transmission on a UL grant designated by the Msg2. The contents of the Msg3 uplink transmission are different for different random access sources. For example, for an initial access, the Msg3 transmits a RRC connection establishment request.

Msg4: A contention resolution message. The UE can determine whether the random access is successful according to the Msg4. For an initial access of the UE, after the contention resolution succeeds, the temporary C-RNTI is automatically converted into a unique UE identifier (C-RNTI) of the UE in the cell.

Figure 2:
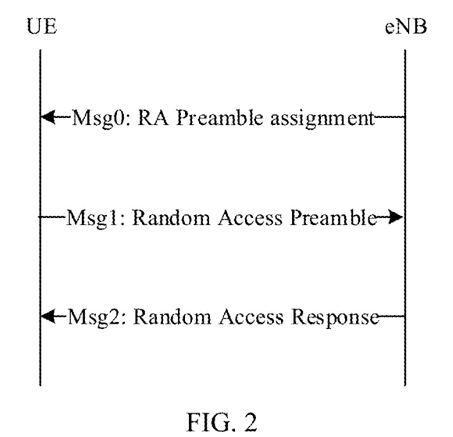
FIG. 2 is a schematic diagram showing a procedure of a three-step non-contention based random access of an LTE system in the related art.

The non-contention based random access is used for handover, downlink data arrival, positioning, and acquisition of uplink timing. Procedures thereof are shown in FIG. 2, primarily including three steps:

Msg0: A base station allocates a dedicated preamble for non-contention based random access and a PRACH resource used for a random access, to a UE.

Msg1: The UE sends a designated dedicated preamble to the base station on a designated PRACH resource according to an instruction from Msg0. After receiving the Msg1, the base station calculates an uplink time advance TA according to the Msg1.

Msg2: The base station sends a random access response to the UE. The random access response includes information about the time advance and a resource allocated UL grant for subsequent uplink transmission, and the time advance is used for the timing relationship of the subsequent uplink transmission of the UE.

Two-step contention based random access is a research hotspot of random access in current 5G systems. At present, in the main solution, a UE identifier is carried by a UE, and the UE identifier is then carried in an Msg2 RAR MAC PDU, wherein a UE determines whether a sent UE identifier is the same as a received UE identifier to determine whether random access is successful. This is only one of the approaches, and it is desired to consider whether there are other solutions.

SUMMARY

In view of the above technical problem, a method and a device for two-step contention based random access are provided according to embodiments of the present disclosure, to achieve two-step contention based random access.

According to a first aspect of embodiments of the present disclosure, a method for two-step contention based random access is provided, including:

sending, by a user equipment (UE), an Msg1 message; and determining that two-step random access of the user equipment is successful, in a case that a UE identifier carried in the Msg1 message is a cell radio network temporary identifier (C-RNTI) and physical layer scheduling signaling addressed based on the C-RNTI is received by the user equipment.

Optionally, the sending, by a user equipment, an Msg1 message comprises:

determining, by the user equipment, whether the user equipment meets a two-step random access triggering condition that a C-RNTI is used as a UE identifier, and sending, by the user equipment, the Msg1 message in a case that the user equipment meets the two-step random access triggering condition, wherein the UE identifier carried in the Msg1 message is the C-RNTI.

Optionally, the two-step random access triggering condition that a C-RNTI is used as a UE identifier comprises that:

the user equipment is currently in an uplink synchronization state or does not need an uplink synchronization, and the user equipment has uplink data to be sent while having no uplink resources; or the user equipment is currently in an uplink synchronization state or does not need an uplink synchronization, and the user equipment hands over.

Optionally, the Msg1 message comprises: a Random Access Preamble and a data portion, and the C-RNTI is carried in the data portion.

Optionally, the data portion further comprises a scheduling request (SR), a buffer status report (BSR) or data.

Optionally, the method further includes:

receiving, by the user equipment, an Msg2 message within an Msg2 message receiving window or before an Msg2 message receiving timer times out, and stopping, by the user equipment, reception of the Msg2 message in a case that the Msg2 message is successfully received by the user equipment, wherein the Msg2 message is a message generated by a network side and corresponding to the Msg1 message.

Optionally, the method further includes:
monitoring, by the user equipment, within an Msg2 message receiving window or before an Msg2 message receiving timer times out,
the physical layer scheduling signaling addressed by using the C-RNTI carried in the Msg1 message.

Optionally, a search space corresponding to the physical layer scheduling signaling is a UE-specific search space.

Optionally, the method further includes:
monitoring, by the user equipment, within an Msg2 message receiving window or before an Msg2 message receiving timer times out:
physical layer scheduling signaling addressed with a temporary cell radio network temporary identifier (T-CRNTI).

Optionally, a search space corresponding to the physical layer scheduling signaling is a common search space.

According to a second aspect of the embodiments of the present disclosure, a method for two-step contention based random access is further provided. The method includes:
receiving, by a network side device, an Msg1 message sent by a user equipment (UE);
determining, by the network side device, that a contention is successful, in a case that the Msg1 is successfully received by the network side device and a UE identifier carried in the Msg1 message is a cell radio network temporary identifier (C-RNTI); and
sending, by the network side device, physical layer scheduling signaling addressed based on the C-RNTI, to the user equipment to schedule an Msg2 transmission.

Optionally, the Msg1 message comprises a Random Access Preamble and a data portion, and the C-RNTI is carried in the data portion.

Optionally, the data portion further comprises an SR, a BSR or data.

Optionally, the method further includes:
sending, by the network side device, physical layer scheduling signaling addressed based on a T-CRNTI, to the user equipment to schedule an Msg2 transmission, in a case that only the Random Access Preamble in the Msg1 can be successfully received by the network side device while the data portion is not successfully received.

Optionally, the physical layer scheduling signaling addressed based on the C-RNTI or addressed based on a T-CRNTI needs to be sent within an Msg2 message receiving window or before an Msg2 message receiving timer times out.

According to a third aspect of the embodiments of the present disclosure, a user equipment (UE) is further provided. The user equipment includes:
a first sending module, configured to send an Msg1 message; and
a first determining module, configured to determine that two-step random access of the user equipment is successful, in a case that a UE identifier carried in the Msg1 message is a cell radio network temporary identifier (C-RNTI) and physical layer scheduling signaling addressed based on the C-RNTI is received by the sending module.

Optionally, the first sending module includes:
a determining unit, configured to determine whether the user equipment meets a two-step random access triggering condition that a C-RNTI is used as a UE identifier; and
a sending unit, configured to send the Msg1 message in a case that the user equipment meets the two-step random access triggering condition that a C-RNTI is used as a UE identifier, wherein the UE identifier carried in the Msg1 message is the C-RNTI.

Optionally, the two-step random access triggering condition that a C-RNTI is used as a UE identifier comprises that:
the user equipment is currently in an uplink synchronization state or does not need an uplink synchronization, and the user equipment has uplink data to be sent while having no uplink resources; or
the user equipment is currently in an uplink synchronization state or does not need an uplink synchronization, and the user equipment hands over.

Optionally, the Msg1 message comprises a Random Access Preamble and a data portion, and the C-RNTI is carried in the data portion.

Optionally, the data portion further comprises an SR, a BSR or data.

Optionally, the user equipment further includes:
a first receiving module, configured to receive an Msg2 message within an Msg2 message receiving window or before an Msg2 message receiving timer times out, and stop reception of the Msg2 message in a case that the Msg2 message is successfully received, wherein the Msg2 message is a message generated by a network side and corresponding to the Msg1 message.

Optionally, the user equipment further includes:
a first monitoring module, configured to monitor the physical layer scheduling signaling addressed by using the C-RNTI carried in the Msg1 message, within an Msg2 message receiving window or before an Msg2 message receiving timer times out.

Optionally, a search space corresponding to the physical layer scheduling signaling is a UE-specific search space.

Optionally, the user equipment further includes:
a second monitoring module, configured to monitor physical layer scheduling signaling addressed with a temporary cell radio network temporary identifier (T-CRNTI), within an Msg2 message receiving window or before an Msg2 message receiving timer times out.

Optionally, a search space corresponding to the physical layer scheduling signaling is a common search space.

According to a fourth aspect of the embodiments of the present disclosure, a network side device is further provided. The network side device includes:
a second receiving module, configured to receive an Msg1 message sent by a user equipment (UE);
a second determining module, configured to determine that a contention is successful, in a case that the Msg1 is successfully received by the network side device and a UE identifier carried in the Msg1 message is a cell radio network temporary identifier C-RNTI; and
a second sending module, configured to send physical layer scheduling signaling addressed based on the C-RNTI, to the user equipment to schedule an Msg2 transmission.

Optionally, the Msg1 message comprises a Random Access Preamble and a data portion, and the C-RNTI is carried in the data portion.

Optionally, the data portion further comprises an SR, a BSR or data.

Optionally, the network side device further includes:

a third sending module, configured to send physical layer scheduling signaling addressed based on a T-CRNTI, to the user equipment to schedule an Msg2 transmission, in a case that only the Random Access Preamble in the Msg1 can be successfully received by the network side device while the data portion is not successfully received.

Optionally, the physical layer scheduling signaling addressed based on the C-RNTI or addressed based on a T-CRNTI is sent within an Msg2 message receiving window or before an Msg2 message receiving timer times out.

According to a fifth aspect of the embodiments of the present disclosure, a user equipment is provided. The user equipment includes: a memory, a processor, and computer programs stored in the memory and executable by the processor, wherein, when the computer programs are executed by the processor, the processor is configured to implement the method for two-step contention based random access described in the first aspect of the present disclosure.

According to a sixth aspect of the embodiments of the present disclosure, a user equipment is provided. The user equipment includes: a memory, a processor, and computer programs stored in the memory and executable by the processor, wherein, when the computer programs are executed by the processor, the processor is configured to implement the method for two-step contention based random access described in the second aspect of the present disclosure.

According to a seventh aspect of the embodiments of the present disclosure, a computer readable storage medium is provided, on which computer programs are stored, wherein, when the computer programs are executed by a processor, the method for two-step contention based random access described in the first aspect of the present disclosure is implemented.

According to an eighth aspect of the embodiments of the present disclosure, a computer readable storage medium is provided, on which computer programs are stored, wherein, when the computer programs are executed by a processor, the method for two-step contention based random access described in the second aspect of the present disclosure is implemented.

Any one of the foregoing technical solutions of the present disclosure has the following advantages or advantageous effects: for a two-step contention based random access, if the UE identifier carried in the Msg1 message is a C-RNTI, the user equipment determines that the two-step random access is successful in a case that a physical layer scheduling signaling addressed based on the C-RNTI is received by the user equipment. In this way, the two-step contention based random access can be achieved.

DETAILED DESCRIPTION

Exemplary embodiments of the present disclosure will be described in more detail below with reference to the drawings. Although exemplary embodiments of the present disclosure are shown in the drawings, it should be understood that the present disclosure can be carried out in various ways instead of being limited by the embodiments set forth herein. On the contrary, the embodiments are provided to enable a more thorough understanding of the present disclosure and to fully convey the scope of the present disclosure to those skilled in the art.

Figure 3:
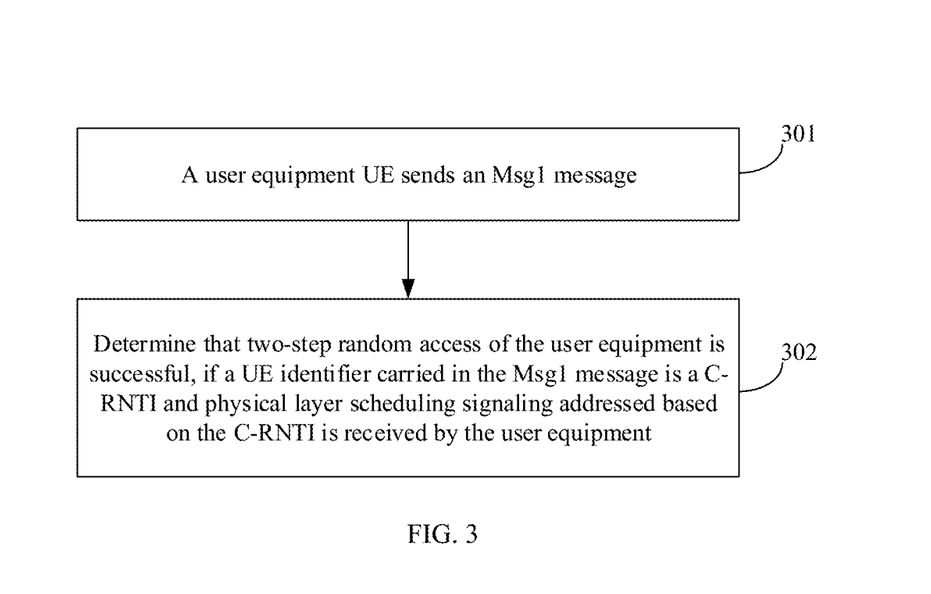
FIG. 3 is a flowchart of a method for two-step contention based random access according to some embodiments of the present disclosure.

Reference is made to FIG. 3, which illustrates a procedure of a method for two-step contention based random access. The method includes steps 301 and 302.

In step 301, a user equipment (UE) sends an Msg1 message.

Optionally, the Msg1 message includes: a Random Access Preamble and a data portion. The cell radio network temporary identifier (C-RNTI) may be carried in the data portion. Further, the data portion further includes a scheduling request (SR), a buffer status report (BSR) or data.

In an optional implementation of the embodiment, the UE determines whether it meets a two-step random access triggering condition that a C-RNTI is used as a UE identifier, and sends the Msg1 message in a case that the user equipment meets the two-step random access triggering condition, wherein the UE identifier carried in the Msg1 message is the C-RNTI.

Optionally, the two-step random access triggering condition that a C-RNTI is used as a UE identifier includes that:

the user equipment is currently in an uplink synchronization state or does not need an uplink synchronization, and the user equipment has uplink data to be sent while having no uplink resources; or the user equipment is currently in an uplink synchronization state or does not need an uplink synchronization, and the user equipment hands over.

In step 302, it is determined that two-step random access of the user equipment is successful, in a case that a UE identifier carried in the Msg1 message is a cell radio network temporary identifier (C-RNTI) and physical layer scheduling signaling addressed based on the C-RNTI is received by the user equipment.

In the embodiment, optionally, the method further includes the following step:

receiving, by the user equipment, an Msg2 message within an Msg2 message receiving window or before an Msg2 message receiving timer times out, and stopping, by the user equipment, reception of the Msg2 message in a case that the Msg2 message is successfully received by the user equipment, wherein the Msg2 message is a message generated by a network side and corresponding to the Msg1 message.

In the embodiment, optionally, the method further includes the following step:

monitoring, by the user equipment, within an Msg2 message receiving window or before an Msg2 message receiving timer times out, the physical layer scheduling signaling addressed by using the C-RNTI carried in the Msg1 message. Further, a search space corresponding to the physical layer scheduling signaling is a UE-specific search space.

In the embodiment, optionally, the method further includes the following step:

monitoring, by the user equipment, within an Msg2 message receiving window or before an Msg2 message receiving timer times out:

physical layer scheduling signaling addressed with a temporary cell radio network temporary identifier (T-CRNTI). Further, a search space corresponding to the physical layer scheduling signaling is a common search space.

In the embodiment, for a two-step contention based random access, if the UE identifier carried in the Msg1 message is a C-RNTI, it is determined that the two-step random access is successful in a case that the physical layer scheduling signaling addressed based on the C-RNTI is received by the UE. In this way, the two-step contention based random access can be achieved.

Figure 4:
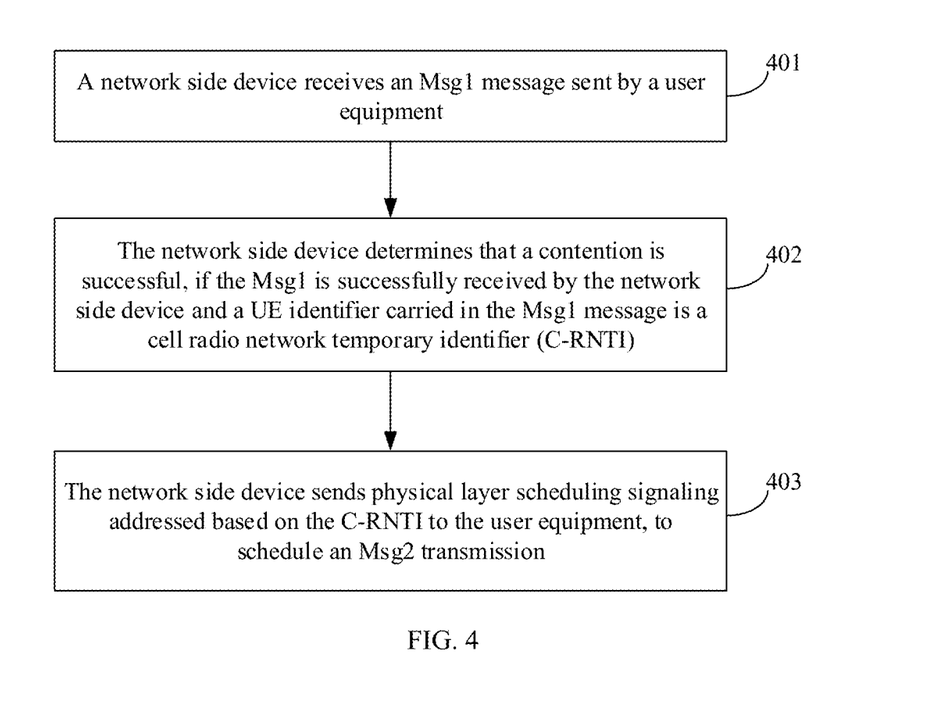
FIG. 4 is a flowchart of a method for two-step contention based random access according to some embodiments of the present disclosure.

Reference is made to FIG. 4, which illustrates a procedure of a method for two-step contention based random access. The method includes steps 401 to 403.

In step 401, a network side device receives an Msg1 message sent by a user equipment (UE).

The network side device may be a base station, and is not limited thereto.

In the embodiment, optionally, the Msg1 message includes: a Random Access Preamble and a data portion, and the C-RNTI may be carried in the data portion. Further, the data portion further includes: an SR, a BSR or data.

In step 402, it is determined by the network side device that a contention is successful, in a case that the Msg1 is successfully received by the network side device and a UE identifier carried in the Msg1 message is a cell radio network temporary identifier (C-RNTI).

In step 403, the network side device sends physical layer scheduling signaling addressed based on the C-RNTI, to the user equipment to schedule an Msg2 transmission.

In the embodiment, the method further includes the following step:

sending, by the network side device, physical layer scheduling signaling addressed based on a T-CRNTI, to the user equipment to schedule an Msg2 transmission, in a case that only the Random Access Preamble in the Msg1 can be successfully received by the network side device while the data portion is not successfully received.

In the embodiment, the physical layer scheduling signaling addressed based on the C-RNTI or addressed based on a T-CRNTI needs to be sent within an Msg2 message receiving window or before an Msg2 message receiving timer times out.

In the embodiment, for a two-step contention based random access, if the UE identifier carried in the Msg1 message is a C-RNTI, it is determined that the two-step random access is successful in a case that the physical layer scheduling signaling addressed based on the C-RNTI is received by the UE. In this way, the two-step contention based random access can be achieved.

Figure 5:
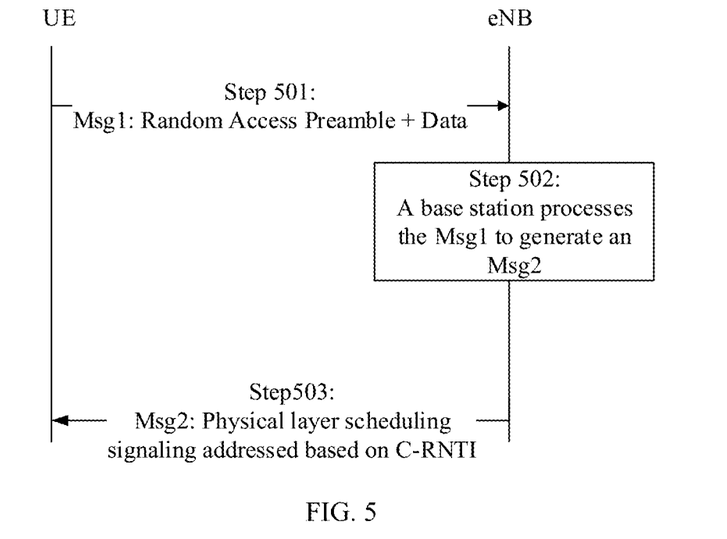
FIG. 5 is a flowchart of a method for two-step contention based random access according to some embodiments of the present disclosure.

Reference is made to FIG. 5, which illustrates a procedure of a successful two-step contention based random access. The successful random access includes steps 501 to 503.

In step 501, a user equipment (UE) sends an Msg1 message.

A UE having a C-RNTI determines whether it meets a two-step contention based random access triggering condition, and triggers a two-step contention based random access in a case that the user equipment meets the triggering condition.

The two-step random access triggering condition that a C-RNTI is used as a UE identifier includes that: the user equipment is currently in an uplink synchronization state or does not need an uplink synchronization (for example, the coverage of a cell is very small and is less than one time advance (TA) adjustment step), and the user equipment has uplink data to be sent while having no uplink resources; or the user equipment hands over.

Optionally, the Msg1 message includes: a Random Access Preamble and a data portion. The C-RNTI is carried in the data portion. In addition, the data portion may further include: an SR/BSR, or data.

In step 502, the Msg1 message is processed by a base station, and an Msg2 message is generated.

If the Msg1 message, including the Random Access Preamble and the data portion, is successfully received by the base station, it is determined that the contention is successful. In this case, physical layer scheduling signaling addressed based on the C-RNTI is sent to the user equipment. The C-RNTI is a C-RNTI included in the data portion of the Msg1 message.

It should be noted that, the Msg2 message needs to be sent within a window corresponding to the Msg2 message or before a timer corresponding to the Msg2 message times out.

In step 503, the Msg2 message is processed by the user equipment.

In the embodiment, the user equipment receives the Msg2 message only within the Msg2 message receiving window or before the Msg2 message receiving timer times out, and stops reception of the Msg2 message once the Msg2 message is successfully received.

In the embodiment, within the Msg2 message receiving window or before the Msg2 message receiving timer times out, the user equipment needs to monitor:

the physical layer scheduling signaling addressed by using the C-RNTI carried in the Msg1 message, to determine whether the contention is solved, wherein a search space corresponding to the physical layer scheduling signaling is a UE-specific search space (USS); or physical layer scheduling signaling addressed with a temporary C-RNTI, to retreat to a four-step contention based random access if the two-step contention based random access fails, wherein a search space corresponding to the physical layer scheduling signaling is a Common Search Space (CSS).

In the embodiment, if the contention is successfully solved, the physical layer scheduling signaling addressed based on the C-RNTI may be received by the user equipment within the Msg2 message receiving window or before the Msg2 message receiving timer times out. In this case, it is determined by the user equipment that the contention is successfully solved.

Figure 6:
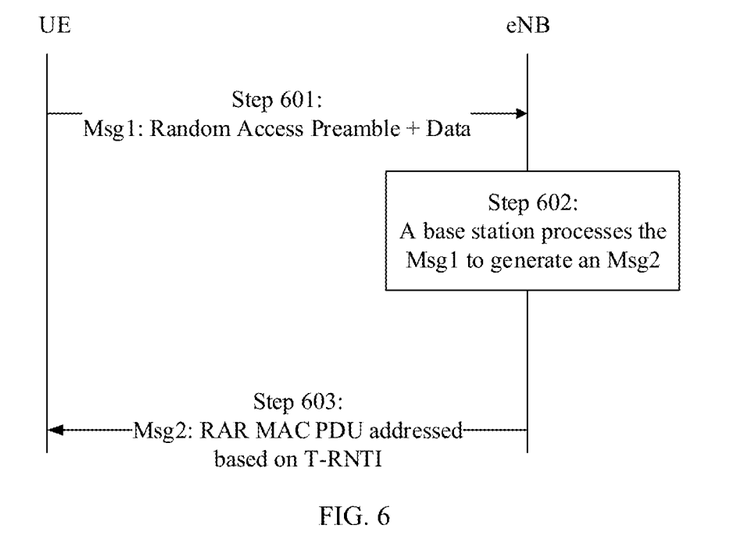
FIG. 6 is a flowchart of a method for two-step contention based random access according to some embodiments of the present disclosure.

Reference is made to FIG. 6, which illustrates a procedure of a failed two-step contention based random access, including steps 601 to 603.

In step 601, a user equipment sends an Msg1 message.

A UE having a C-RNTI determines whether it meets a two-step contention based random access triggering condition, and triggers a two-step contention based random access in a case that the user equipment meets the triggering condition.

The two-step random access triggering condition that a C-RNTI is used as a UE identifier includes that: the user equipment is currently in an uplink synchronization state or does not need an uplink synchronization (for example, the coverage of a cell is very small and is less than one time advance (TA) adjustment step), and the user equipment has uplink data to be sent while having no uplink resources; or the user equipment hands over.

The Msg1 message includes: a Random Access Preamble and a data portion. The C-RNTI is carried in the data portion. In addition, the data portion may further include: an SR/BSR, or data.

In step 602, the Msg1 message is processed by a base station, and an Msg2 message is generated.

In a case that only the Random Access Preamble is received successfully by the base station and the data portion is not successfully received, the process retreats to a four-step contention based random access, to generate an RAR MAC PDU addressed based on the temporary C-RNTI. The Msg2 message needs to be sent within a window corresponding to the Msg2 message or before a timer corresponding to the Msg2 message times out.

If neither the Random Access Preamble nor the data portion is received successfully, no processing is performed, and no content is replied to the user equipment.

In step 603, the Msg2 message is processed by the user equipment.

The user equipment receives the Msg2 message only within the Msg2 message receiving window or before the Msg2 message receiving timer times out, and stops reception of the Msg2 message once the Msg2 message is successfully received.

Within the Msg2 message receiving window or before the Msg2 message receiving timer times out, the user equipment needs to monitor:

the physical layer scheduling signaling addressed by using the C-RNTI carried in the Msg1 message, to determine whether the contention is solved, wherein a search space corresponding to the physical layer scheduling signaling is a UE-specific search space (USS); or physical layer scheduling signaling addressed with a temporary C-RNTI, to retreat to a four-step contention based random access if the two-step contention based random access fails, wherein a search space corresponding to the physical layer scheduling signaling is a Common Search Space (CSS).

In the embodiment, if nothing is received within the Msg2 message receiving window or before the Msg2 message receiving timer times out, the random access is directly determined to be failed, and subsequent two-step or four-step random access is attempted.

If the physical layer scheduling signaling addressed based on the temporary C-RNTI is received by the user equipment within the Msg2 message receiving window or before the Msg2 message receiving timer times out, the user equipment receives the RAR MAC PDU in response to an indication of the temporary C-RNTI and proceeds with a four-step random access. An Msg3 message for the four-step contention based random access is sent by using a UL grant indicated in the RAR MAC PDU.

Figure 7:
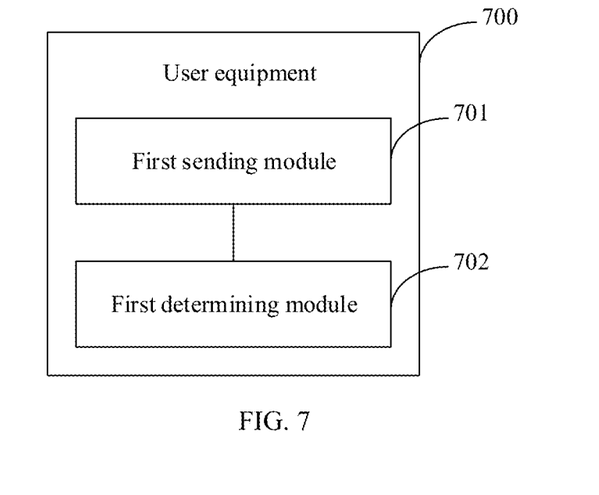
FIG. 7 is a block diagram of a user equipment according to some embodiments of the present disclosure.

Reference is made to FIG. 7, which illustrates a user equipment (UE). The UE 700 includes:

a first sending module 701, configured to send an Msg1 message; and a first determining module 702, configured to determine that two-step random access of the user equipment is successful, in a case that a UE identifier carried in the Msg1 message is a cell radio network temporary identifier (C-RNTI) and physical layer scheduling signaling addressed based on the C-RNTI is received by the sending module.

In the embodiment, optionally, the first sending module 701 includes:

a determining unit, configured to determine whether the user equipment meets a two-step random access triggering condition that a C-RNTI is used as a UE identifier; and a sending unit, configured to send the Msg1 message in a case that the user equipment meets the two-step random access triggering condition that a C-RNTI is used as a UE identifier, wherein the UE identifier carried in the Msg1 message is the C-RNTI.

In the embodiment, optionally, the two-step random access triggering condition that a C-RNTI is used as a UE identifier comprises that:

the user equipment is currently in an uplink synchronization state or does not need an uplink synchronization, and the user equipment has uplink data to be sent while having no uplink resources; or the user equipment is currently in an uplink synchronization state or does not need an uplink synchronization, and the user equipment hands over.

In the embodiment, optionally, the Msg1 message comprises a Random Access Preamble and a data portion, and the C-RNTI is carried in the data portion.

In the embodiment, optionally, the data portion further comprises an SR, a BSR or data.

In the embodiment, optionally, the user equipment further includes:

a first receiving module, configured to receive an Msg2 message within an Msg2 message receiving window or before an Msg2 message receiving timer times out, and stop reception of the Msg2 message in a case that the Msg2 message is successfully received, wherein the Msg2 message is a message generated by a network side and corresponding to the Msg1 message.

In the embodiment, optionally, the user equipment further includes:

a first monitoring module, configured to monitor the physical layer scheduling signaling addressed by using the C-RNTI carried in the Msg1 message, within an Msg2 message receiving window or before an Msg2 message receiving timer times out.

In the embodiment, optionally, a search space corresponding to the physical layer scheduling signaling is a UE-specific search space.

In the embodiment, optionally, the user equipment further includes:

a second monitoring module, configured to monitor physical layer scheduling signaling addressed with a temporary cell radio network temporary identifier (T-CRNTI), within an Msg2 message receiving window or before an Msg2 message receiving timer times out.

In the embodiment, optionally, a search space corresponding to the physical layer scheduling signaling is a common search space.

In the embodiment, for a two-step contention based random access, if the UE identifier carried in the Msg1 message is a C-RNTI, the user equipment determines that the two-step random access is successful in a case that the physical layer scheduling signaling addressed based on the C-RNTI is received by the user equipment. In this way, the two-step contention based random access can be achieved.

Figure 8:
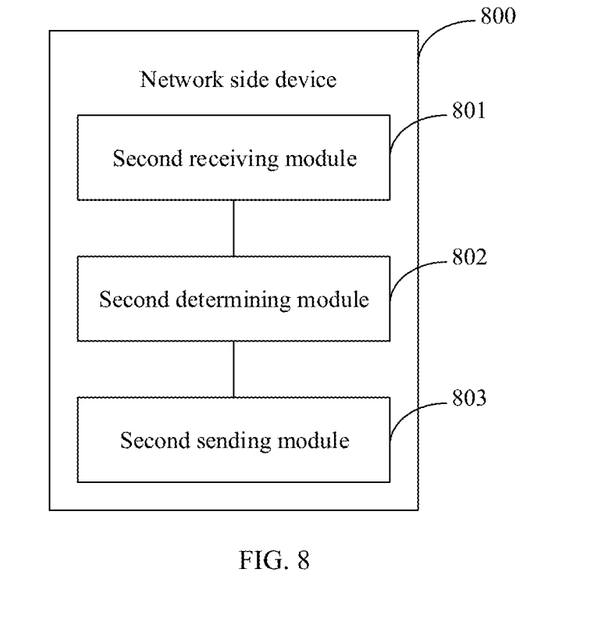
FIG. 8 is a block diagram of a network side device according to some embodiments of the present disclosure.

Reference is made to FIG. 8, which illustrates a network side device.

The network side device 800 includes:

a second receiving module 801, configured to receive an Msg1 message sent by a user equipment (UE);

a second determining module 802, configured to determine that a contention is successful, in a case that the Msg1 is successfully received by the network side device and a UE identifier carried in the Msg1 message is a cell radio network temporary identifier C-RNTI; and a second sending module 803, configured to send physical layer scheduling signaling addressed based on the C-RNTI, to the user equipment to schedule an Msg2 transmission.

In the embodiment, optionally, the Msg1 message includes: a Random Access Preamble and a data portion, and the C-RNTI is carried in the data portion.

In the embodiment, optionally, the data portion further includes: an SR, a BSR or data.

In the embodiment, optionally, the network side device further includes:

a third sending module, configured to send physical layer scheduling signaling addressed based on a T-CRNTI, to the user equipment to schedule an Msg2 transmission, in a case that only the Random Access Preamble in the Msg1 can be successfully received by the network side device while the data portion is not successfully received.

In the embodiment, optionally, the physical layer scheduling signaling addressed based on the C-RNTI or addressed based on a T-CRNTI needs to be sent within an Msg2 message receiving window or before an Msg2 message receiving timer times out.

For a two-step contention based random access, if the UE identifier carried in the Msg1 message is a C-RNTI, the user equipment determines that the two-step random access is successful in a case that the physical layer scheduling signaling addressed based on the C-RNTI is received by the user equipment. In this way, the two-step contention based random access can be achieved.

It is to be understood that the phrase "one embodiment" or "an embodiment" mentioned throughout the specification means that particular features, structures or characteristics related to the embodiment are included in at least one embodiment of the present disclosure. Therefore, the phrase "in one embodiment" or "in an embodiment" appearing at various parts of the entire specification does not necessarily refer to the same embodiment. In addition, these particular features, structures, or characteristics may be combined in any suitable manner in one or more embodiments.

In various embodiments of the present disclosure, it should be understood that the magnitude of the serial numbers of the above processes does not mean the order of execution, and the order of execution of each process should be determined by its function and internal logic, and should not limit the implementation process of the embodiments of the present disclosure.

Additionally, the terms "system" and "network" are used interchangeably herein.

It should be understood that the term "and/or" as used herein is merely to describe an association relationship of associated objects, indicating that there may be three relationships. For example, A and/or B may indicate the following three situations: A exists separately, A and B exist simultaneously, and B exists separately. In addition, the character "/" as used herein generally indicates that the associated objects are of an "or" relationship.

In the embodiments provided by the present disclosure, it should be understood that "B corresponding to A" means that B is associated with A, and B can be determined according to A. However, it should also be understood that determining B according to A does not mean that B is determined only according to A; instead, B can also be determined according to A and/or other information.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of a combination of hardware functional units and software functional units.

The above described integrated unit implemented in the form of software functional unit can be stored in a computer readable storage medium. The above software functional unit is stored in a storage medium and includes a plurality of instructions for enabling a computer device (which may be a personal computer, a server, or a network side device, etc.) to execute part of the steps of the transceiving method of the various embodiments of the present disclosure. The foregoing storage medium includes: a U disk, a mobile hard disk, a Read-Only Memory (ROM), a Random Access Memory (RAM), a magnetic disk or an optical disk, and various media that can store program codes thereon.

Described above are optional embodiments of the present disclosure, and it should be noted that those skilled in the art can also make various improvements and modifications without departing from the principles of the present disclosure, which will also fall within the protection scope of the present disclosure.

What is claimed is:

1. A method for two-step contention based random access, comprising:

sending, by a user equipment (UE), an Msg1 message; and determining that two-step random access of the user equipment is successful, in a case that a UE identifier carried in the Msg1 message is a cell radio network temporary identifier (C-RNTI) and physical layer scheduling signaling addressed based on the C-RNTI is received by the user equipment;

the method further comprises:

monitoring, by the user equipment, within an Msg2 message receiving window or before an Msg2 message receiving timer times out, the physical layer scheduling signaling addressed by using the C-RNTI carried in the Msg1 message and a physical layer scheduling signaling addressed with a temporary cell radio network temporary identifier (T-CRNTI), wherein the physical layer scheduling signaling addressed with the T-CRNTI is used for retreating to a four-step contention based random access in a case that the two-step contention based random access fails;

wherein a search space corresponding to the physical layer scheduling signaling addressed by using the C-RNTI carried in the Msg1 message is a UE-specific search space.

2. The method according to claim 1, wherein the sending, by a user equipment, an Msg1 message comprises:

determining, by the user equipment, whether the user equipment meets a two-step random access triggering condition that a C-RNTI is used as a UE identifier, and sending, by the user equipment, the Msg1 message in a case that the user equipment meets the two-step random access triggering condition, wherein the UE identifier carried in the Msg1 message is the C-RNTI.

3. The method according to claim 2, wherein the two-step random access triggering condition that a C-RNTI is used as a UE identifier comprises that:

the user equipment is currently in an uplink synchronization state or does not need an uplink synchronization, and the user equipment has uplink data to be sent while having no uplink resources; or the user equipment is currently in an uplink synchronization state or does not need an uplink synchronization, and the user equipment hands over.

4. The method according to claim 1, wherein the Msg1 message comprises: a Random Access Preamble and a data portion, and the C-RNTI is carried in the data portion.

5. The method according to claim 4, wherein the data portion further comprises a scheduling request (SR), a buffer status report (BSR) or data.

6. The method according to claim 1, further comprising:

receiving, by the user equipment, an Msg2 message within the Msg2 message receiving window or before the Msg2 message receiving timer times out, and stopping, by the user equipment, reception of the Msg2 message in a case that the Msg2 message is successfully received by the user equipment, wherein the Msg2 message is a message generated by a network side and corresponding to the Msg1 message.

7. The method according to claim 1, wherein a search space corresponding to the physical layer scheduling signaling addressed with the T-CRNTI is a common search space.

8. A user equipment, comprising: a memory, a processor, and computer programs stored in the memory and executable by the processor, wherein, when the computer programs are executed by the processor, the processor is configured to implement the method according to claim 1.

9. The user equipment according to claim 8, wherein the sending, by a user equipment, an Msg1 message comprises:

determining, by the user equipment, whether the user equipment meets a two-step random access triggering condition that a C-RNTI is used as a UE identifier, and sending, by the user equipment, the Msg1 message in a case that the user equipment meets the two-step random access triggering condition, wherein the UE identifier carried in the Msg1 message is the C-RNTI.

10. The user equipment according to claim 9, wherein the two-step random access triggering condition that a C-RNTI is used as a UE identifier comprises that:

the user equipment is currently in an uplink synchronization state or does not need an uplink synchronization, and the user equipment has uplink data to be sent while having no uplink resources; or the user equipment is currently in an uplink synchronization state or does not need an uplink synchronization, and the user equipment hands over.

11. The user equipment according to claim 8, wherein a search space corresponding to the physical layer scheduling signaling addressed with the T-CRNTI is a common search space.

12. A non-transitory computer readable storage medium, on which computer programs are stored, wherein, when the computer programs are executed by a processor, the method according to claim 1 is implemented.

13. The method according to claim 1, further comprising:

in a case that the physical layer scheduling signaling addressed based on the C-RNTI or the temporary C-RNTI is not received by the user equipment within the Msg2 message receiving window or before the Msg2 message receiving timer times out, directly determining the random access to be failed, and attempting subsequent two-step or four-step random access;

in a case that the physical layer scheduling signaling addressed based on the temporary C-RNTI is received by the user equipment within the Msg2 message receiving window or before the Msg2 message receiving timer times out, receiving an RAR MAC PDU in response to an indication of the temporary C-RNTI and proceeding with a four-step random access, wherein an Msg3 message for a four-step contention based random access is sent by using a UL grant indicated in the RAR MAC PDU.

14. A method for two-step contention based random access, comprising:

receiving, by a network side device, an Msg1 message sent by a user equipment (UE);

determining, by the network side device, that a contention is successful, in a case that the Msg1 is successfully received by the network side device and a UE identifier carried in the Msg1 message is a cell radio network temporary identifier (C-RNTI), and sending, by the network side device, physical layer scheduling signaling addressed based on the C-RNTI, to the user equipment to schedule an Msg2 transmission; and sending, by the network side device, physical layer scheduling signaling addressed based on a T-CRNTI, to the user equipment to schedule an Msg2 transmission, in a case that only a Random Access Preamble in the Msg1 can be successfully received by the network side device while a data portion is not successfully received, wherein the physical layer scheduling signaling addressed with the T-CRNTI is used for retreating to a four-step contention based random access in a case that the two-step contention based random access fails;

wherein the physical layer scheduling signaling addressed based on the C-RNTI or addressed based on the T-CRNTI needs to be sent within an Msg2 message receiving window or before an Msg2 message receiving timer times out;

wherein a search space corresponding to the physical layer scheduling signaling addressed based on the C-RNTI carried in the Msg1 message is a UE-specific search space.

15. The method according to claim 14, wherein the Msg1 message comprises the Random Access Preamble and the data portion, and the C-RNTI is carried in the data portion.

16. The method according to claim 15, wherein the data portion further comprises an SR, a BSR or data.

17. A network side device, comprising: a memory, a processor, and computer programs stored in the memory and executable by the processor, wherein, when the computer programs are executed by the processor, the processor is configured to implement the method according to claim 14.

18. The network side device according to claim 17, wherein the Msg1 message comprises the Random Access Preamble and the data portion, and the C-RNTI is carried in the data portion.

19. The network side device according to claim 18, wherein the data portion further comprises an SR, a BSR or data.

20. A non-transitory computer readable storage medium, on which computer programs are stored, wherein, when the computer programs are executed by a processor, the method according to claim 14 is implemented.

\* \* \* \* \*